United States Patent [19]
Greenberg et al.

[11] Patent Number: 4,656,532
[45] Date of Patent: Apr. 7, 1987

[54] SECTOR IDENTIFICATION METHOD FOR HARD SECTORED HARD FILES

[75] Inventors: Richard Greenberg; David A. Styczinski, both of Rochester, Minn.

[73] Assignee: International Business Machines Corporation, Armonk, N.Y.

[21] Appl. No.: 759,730

[22] Filed: Jul. 29, 1985

[51] Int. Cl.$^4$ ............................................. G11B 5/09
[52] U.S. Cl. .................................... 360/48; 360/49
[58] Field of Search .......................... 360/48, 49, 72.2

[56] References Cited
U.S. PATENT DOCUMENTS 4,507,693  3/1985  Matsuda et al. .................... 360/72.2

*Primary Examiner*—Vincent P. Canney
*Attorney, Agent, or Firm*—Robert W. Lahtinen

[57] ABSTRACT

A disk file control provides for tracks having defective sectors by forming sectors as a single, uninterrupted stream of serial data containing both identifier (ID) and data portions. Reading a single ID portion characterizes the entire track to permit writing data without a separate revolution to read the ID field. The ID information includes the offset of the first logical sector on the track and the locations of defective sectors that must be skipped. As soon as one ID is read, the location of the addressed sector is ascertained and the ID data for the sector to be written is formulated so that the entire sector including both ID and data can be written when the sector first approaches the transducer. If alternate sectors are permitted on a subsequent track under the strategy being used, a single ID on the track will define where the logical sectors making up that track will appear (either the physical sector location on the track or at an alternate location on the next track).

8 Claims, 6 Drawing Figures

| PAD | SERVO | SYNC | ID | DATA & ECC | PAD |

FIG. 1

ID SECTOR PORTION

| CYL | HD | SECT | FLAG | DISPLACEMENT | DEFECT LIST | OTHER |

FIG. 2

SECTOR IDENTIFICATION METHOD FOR HARD SECTORED HARD FILES

BACKGROUND OF THE INVENTION

This invention pertains to rotary storage devices wherein data is stored in parallel tracks and more particularly to a sector identification technique which eliminates the need to read an identification field for each sector while identifying and accommodating random defective sectors.

In rotating memory devices, the configuration of the sectors into which the tracks of information are partitioned each employs an identification (ID) field with a preceding sync field and a trailing cyclic redundancy check (CRC) or other check field and a data field with its preceding sync field and trailing error correction code (ECC). The use of an error correction code makes the writing and retrieval of data more reliable and enables higher track and bit densities to be achieved with the same reliability. However, to realize the benefits of the use of an ECC with data, the reading of the ID field must be done with the same reliability. This would indicate that instead of a simple parity or cyclic redundancy check, the ID field must be read with the same reliability as the data field using an ECC of some substantial sophistication. To provide the same reliability, the same level of error recovery should protect both ID and data fields. If the fields are combined to achieve this result, the recording technique must be one that does not require one revolution to read the ID and a second revolution to record data since such an extended time period would degrade the overall performance of the storage device.

SUMMARY OF THE INVENTION

The read/write technique and the implementing structure of the present invention provide an error correction code that protects both the ID and data fields since both are read and written at the same time as a single continuous stream of data. Each ID field characterizes the track by identifying the track, the physical sector, the displacement of logical addresses from physical addresses, a list of the defective sectors on the track and various flag bits. All of the information in the sector ID field may be predetermined by reading any other sector on the track, provided that no more than the number of defects accommodated in the defect list exist on the track. If the particular defect strategy used will tolerate a number of defects on a given track greater than the number of sectors that can be included in the defect list, it will be necessary to read more than a single sector ID on a track which has a greater number of defects than are accommodated by the defect list. To write a sector, it is only necessary to read a single ID field on the track and thereafter count sector reference pulses until it is known that the next sector is the one to be written. Following the sync field, the ID field is rewritten and the data and ECC fields written as a single continuous sequence of data. Likewise, a record can be written as a sequence of data sector portions while skipping known defective sectors which were identified in the defect list of the single ID field read on the track.

BRIEF DESCRIPTION OF THE DRAWING

FIG. 1 is a schematic showing of the single continuous sector format including both ID and data portions.

FIG. 2 is a schematic showing of a typical ID sector portion format for use with the present invention.

DETAILED DESCRIPTION

Figure 3:
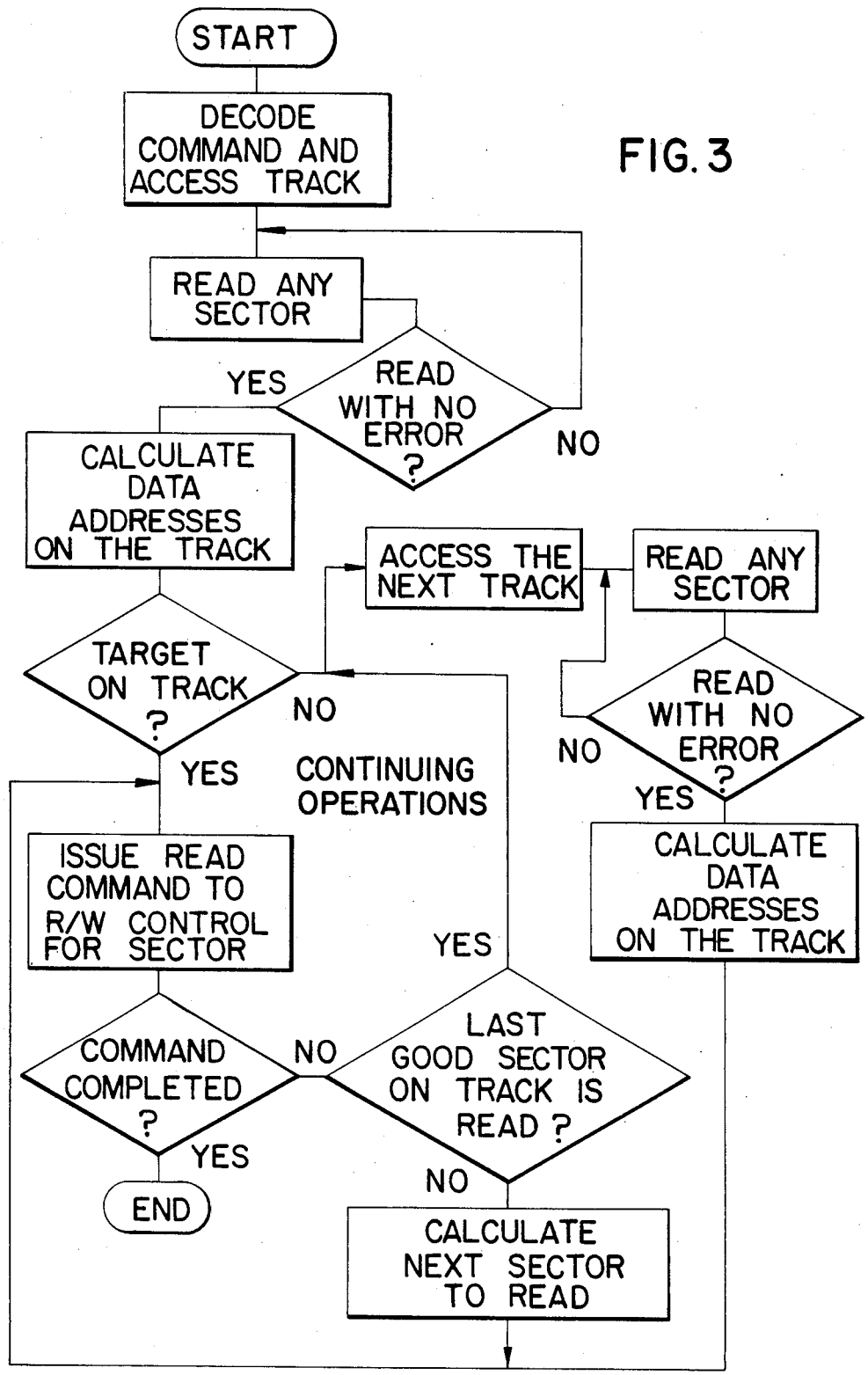
FIG. 3 is a flow diagram of a read operation using the format and strategy of this invention.

The goal achieved by the invention is the combining of the ID field and the data field associated with a sector. From this combination various benefits are derived. The sector overhead is reduced because the one sync field and the read/write gap eliminated are larger than the amount of information that must be added to the ID field. The ID field can be brought under the protection of the same ECC as the data and thus guaranteed the same degree of protection. Also the CRC associated with the ID can be decreased or eliminated, further reducing the overhead and eliminating the CRC generating hardware. The sync field can be reduced in size or the reliability of the sync circuitry improved since the sync field always occurs immediately after the sector reference pulse and thus is located more precisely. The read/write hardware is simplified because the read ID and read data are combined; write ID and write data operations are combined and operations to recover data and ID's from defective sectors are not needed. Also eliminated are the commands read data physical, read ID extended and write ID extended. It is not necessary to read an ID from a defective sector except in the rare circumstance where most of the sectors of a track are defective. Even then only some of these ID's need be read. Reliability of the ID's is improved because the ID is rewritten every time the data is written.

Combining the ID and data fields, while minimizing the number of disk revolutions needed to read and write imposes constraints. Reading a small number of ID's (usually one) must provide all the information necessary to deduce the ID for every sector on the track. The ID and data must be written together, but an entire revolution to first read the ID and then to write it can not be allowed and it must be possible to write sequential sectors in one revolution. Reliable hard sectoring is required because once the ID's on the track are known, sector reference pulses must be counted to locate the desired sectors.

FIG. 1 shows schematically the organization of a sector on a track. The servo field provides the means for track following and sector reference pulse generation. The sync field is a pattern which allows the variable frequency oscillator (VFO) to be initialized for reads. The ID field provides sector identification which will be discussed below. The data field provides data storage and the ECC is the data redundancy needed to protect against errors. The ECC may be interspersed throughout the data or may occur at the end, and may also cover the ID field data. The pad is a short region which provides for signals to flush the data from the data channel and for various electrical and mechanical tolerances.

It is the structure and organization of the ID field that makes the combining of the ID and data fields practical. FIG. 2 shows the format of the ID portion of the sector.

The relative order of the subfields is unimportant. The track ID is a number which identifies the cylinder and head. The physical sector number is a number that identifies the position of the sector on the track relative to some selected point. All sectors including defective sectors are numbered in order from 1 to N where N is the number of sectors on the track. The displacement is a number which completes the information needed to calculate the physical address from the logical address. The displacement can be defined in different ways depending on the defect strategy selected. Three definitions are described for purposes of illustration:

1. The displacement is the number of defective sectors between some reference point and the physical sector. With this method, the displacement is 0 at the reference point and is incremented for each defect which is skipped. In the segment that lies between two reference points, the spare sectors occur at the end. If the spares are used to replace defects in other segments, then the "used as an alternate" flag is on and the displacement is used as a reverse pointer and has a different meaning.

2. The displacement is the offset from the physical beginning of the track to the beginning of the logical track. This one number appears in every sector on the track. The sectors between the beginning of the physical track and the beginning of the logical track contain sectors pushed onto the physical track from the previous track, spares, and any intervening defects. A "used as an alternate" flag is not needed. If the number of defects allowed on a track is limited to D (the size of the defect list), no flags at all are needed.

3. The displacement as described in 2 above except that the intervening defects are not included because these can be determined from the defect list.

Three different strategies illustrating use of these different displacements are described hereafter. The defective sector list is a list of the physical sector numbers of the defective sectors found on the track. If there are more defective sectors than space (D) in the list, then the first D sectors following the current physical sector are given. In addition, the "more than D defective sectors" bit is turned on in the flags. To avoid this flag, one could limit tracks to no more than D defective sectors. If fewer than D defective sectors are on the track, the remainder of the defective sector list is filled with zeros (any nonvalid sector number will serve). The selection of D depends on the file surface defect rate and on the desired performance. The flags indicate special situations. In addition to the "more than D defective sector flag, the defective sector flag may be turned on in each defective sector's ID as an aid to eliminate the need to search the defect list for each sector. The "used as an alternate" flag is used in one of the strategies discussed later, but not in the other. When used it means that the flagged sector has been relocated to the current track from some other track which changes the meaning of the remainder of the ID. The "other" field is for other things that it may be desired to add in the future such as a time written indicator. Data for this field must be predetermined, that is, it must be known what is to be written in the field without reading this field in the sector to be written. This precludes applications such as an individual sector write protect indicator; however, a whole track write protect indicator would be workable.

The ID scheme as described has certain characteristics independent of the defect strategy. If the track contains D or fewer defective sectors, reading one ID allows mapping of all required actions for a complete track read or write operation. Tracks with more than D defective sectors would represent a strategy embodiment that requires more than one ID to be read. In addition, a revolution may be taken to locate all the defects on the track. If when looking for the track defect data a sector with a faulty ID is encountered, it can be ignored and the next sector ID read instead. The rare cases where one out of several defective sectors needs to be read depends on the defect strategy.

When a fixed block address (FBA) is used, which specifies the logical sequential data sector wanted, the ID scheme and defect strategy used must allow the rapid finding of any sector of data given the FBA.

The first embodiment utilizes a segment which is defined as a fixed number of cylinders considered as a group. Also this embodiment does not use the "used as an alternate" flag described previously. The "defective sector" flag provides a convenient indication that the physical sector number is on the defect list of at least one sector ID and is on the defect list of every sector if the track has D or fewer defects. The reference points for the displacement are the beginning of each segment.

As an example illustrating this ID scheme with this defect strategy, consider a file with 76 sectors per track, 4 tracks per cylinder and 20 cylinders per segment. With 72 spares, this would provide 6008 sectors of data per segment out of a total of 6080 sectors. To read the sector associated with FBA=100,000:

100,000/6008=16 remainder 3872
3,872/76=50 remainder 72
50/4=12 remainder 2

The cylinder to access is 16×20+12=332 (the first cylinder is number 0). The track to select is 2 (the tracks or heads are 0,1,2 and 3). The sectors on the preceding tracks of the segment are 50×76=3800. Now seek to cylinder 332, track 2 and read an ID. If the ID is bad, ignore it and read the next ID. As an example the ID may contain: cylinder=332; track=2; physical sector number=25; displacement=25; defect list=24,0,0,0,0 (D=5); and both flags are off.

From this information it is known that the first sector of the track corresponds to the number of sectors on previous tracks minus the displacement plus the number of defective sectors between the sector 1 and the physical sector on the track plus 1, which in the example is 3800−25+1+1=3777. The last sector on the track is then 3800+76−25=3851 since there are 76 sectors on the track with one defective. 3851 is less than 3872 so the sector desired is on the next track (assured by the rules of the defect strategy). If the next track ID yields: cylinder=332; track=3; physical sector=10; displacement=25; defect list=24,25,26,30,0; and both flags are off, then the first sector on the track is 3876−25+1=3852 and the last is 3876+76−25−4=3923, and sector 3872 is on the track as physical sector 21 which is 11 sectors from the ID just read.

On tracks that have more than D (5 in this example) defective sectors (as known via the flags) complete knowledge of the track is not obtained from one ID, but a portion of the track is defined. If the data is not in that portion, then more ID's must be read. At worst, one revolution is added. The length D of the defect list is chosen to make this occurrence as rare as desired. Also files requiring this could be rejected. To facilitate calculation it might be desirable when the number of defects exceed D, to put only the next D−1 defects in the defect list and put the displacement of the first sector on the track into the other defect list position.

Another embodiment of this ID scheme provides for spares on each track. When the spares on a track are used up, then the overflow (secondaries) is placed on other tracks. Various schemes for allocating to nearby tracks (scatter method) or to special alternate tracks or to a combination exist. Secondaries stored on special tracks on which no other data is stored do not need the "used as an alternate" flag since they are in effect all used as an alternate. It should be clear by analogy from the following discussion how this case and some others are handled.

The following description assumes the use of a scatter method of relocating secondaries to a few nearby tracks. The "used as an alternate" flag means that the associated sector of data is a secondary from another track. Then the space for the defect list is used instead for a pointer back to the track of origin. When finding a secondary, an algorithm which specifies a sequence of possible locations is followed and the pointer in each flagged ID checked until the secondary is found. A secondary is normally relocated to the first open (unused for data) sector allocated by the same algorithm.

The reference point for the displacement is now the beginning of each track. As an example, consider a file with 76 sectors per track, 2 spares per track and 4 tracks per cylinder and suppose the sector associated with FBA=100,000 is to be read. 100,000/74=1351 remainder 26. 1351/4=337 remainder 3. Then the cylinder to access is 337. The track to select is 3. The logical sector on the track is 26. Now seek to cylinder 337, track 3 and read an ID. It has cylinder 337, track 3, physical sector number =25, displacement=1, defect list=24,0,0,0,0 (D=5) and all 3 flags are off. From this information we calculate that logical sector 26 is located on physical sector 27 which is 2 sectors from the one just read. Had the first ID read had the "used as an alternate" flag on, the next ID would have been read before continuing, unless we were looking for a secondary.

A third embodiment of this ID scheme provides spares on each track. When spares on a track are used up, then spares on subsequent tracks are used. These spares are used by pushing down all the intervening data and putting the relocated data into the new opening. Spares may be moved and saved for future use in a similar manner. Thus the logical sectors are kept physically in sequential order.

Either of the last two displacements described may be used, but for the description the displacement is the sum; sectors pushed onto the track from the previous track plus the unused spares reserved for the present track plus any defective sectors (sectors in the defect list) between the beginning of the track and the sector indicated by the displacement. In this method, the logical sectors are organized into ideal tracks which are mapped onto the fixed physical tracks. The displacement then points to the beginning of the ideal track. No flags are used.

Addressing data on the file depends on whether the sector addressed is the first of a data block or whether the operation is continuing from a previous track. This example uses the file described in the previous example.

On the first access, the FBA is converted to the idealized cylinder, head and sector number. For FBA=100,000 these are respectively 337, 3, and 26. The cylinder and head are accessed and a sector ID read. The displacement is added to the ideal sector number as is the number of defective sectors between the displacement and the target sector number. If the target sector number is greater than the physical number of sectors on a track (76), the next track must be accessed. Before that, the number of sectors loaned to the next track is calculated by subtracting the ideal sector number of the target sector from the ideal track size (74). This number is saved to be used to calculate as described below for continuing operations. Otherwise, the operation continues on track until it is done or the next ideal sector is on the next track. If the next ideal sector is on the next track, the loaned sector number is calculated and saved and the operation proceeds after the next track is accessed. Continuing operations begin with the reading of a sector ID as before. Now however, the number of sectors loaned is subtracted from the displacement and the result adjusted for intervening defective sectors to find the target sectors. Then sectors are read or written sequentially until the operation is completed or the physical track is exhausted and another continuing operation is needed.

The flow diagram of FIG. 3 illustrates the read sequence using the sector configuration of this invention and the third embodiment described above. When the addressed track is accessed, the reading of a single ID shows the physical position of the desired sector on the track or if the addressed sector is on the next track the accessing of the next track is initiated. The read is continued until the command is completed.

Figure 4:
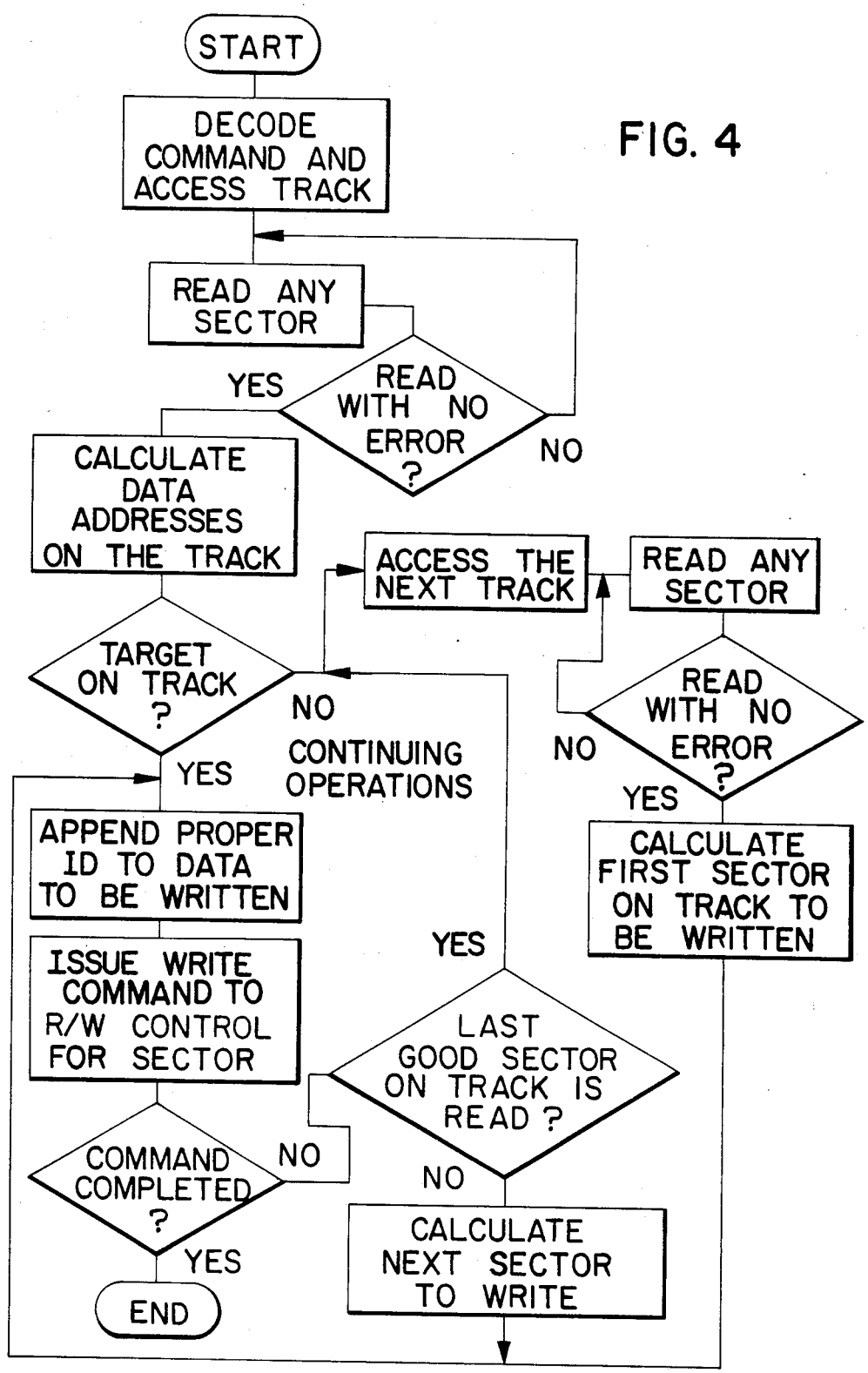
FIG. 4 is a flow diagram of a write operation using the format of FIG. 1.

The write operation of the flow diagram of FIG. 4 starts as the command is decoded and the track is accessed. As soon as one ID is read without error it is determined whether the addressed sector is on the track or on the next track. If on the track, the single ID read identifies the physical position of the sector and the information to formulate the ID data to be written to enable the write command to effect writing of the sector when the sector first appears adjacent the transducer thereafter. Successive good sectors are written thereafter until the write command is completed.

Figure 5:
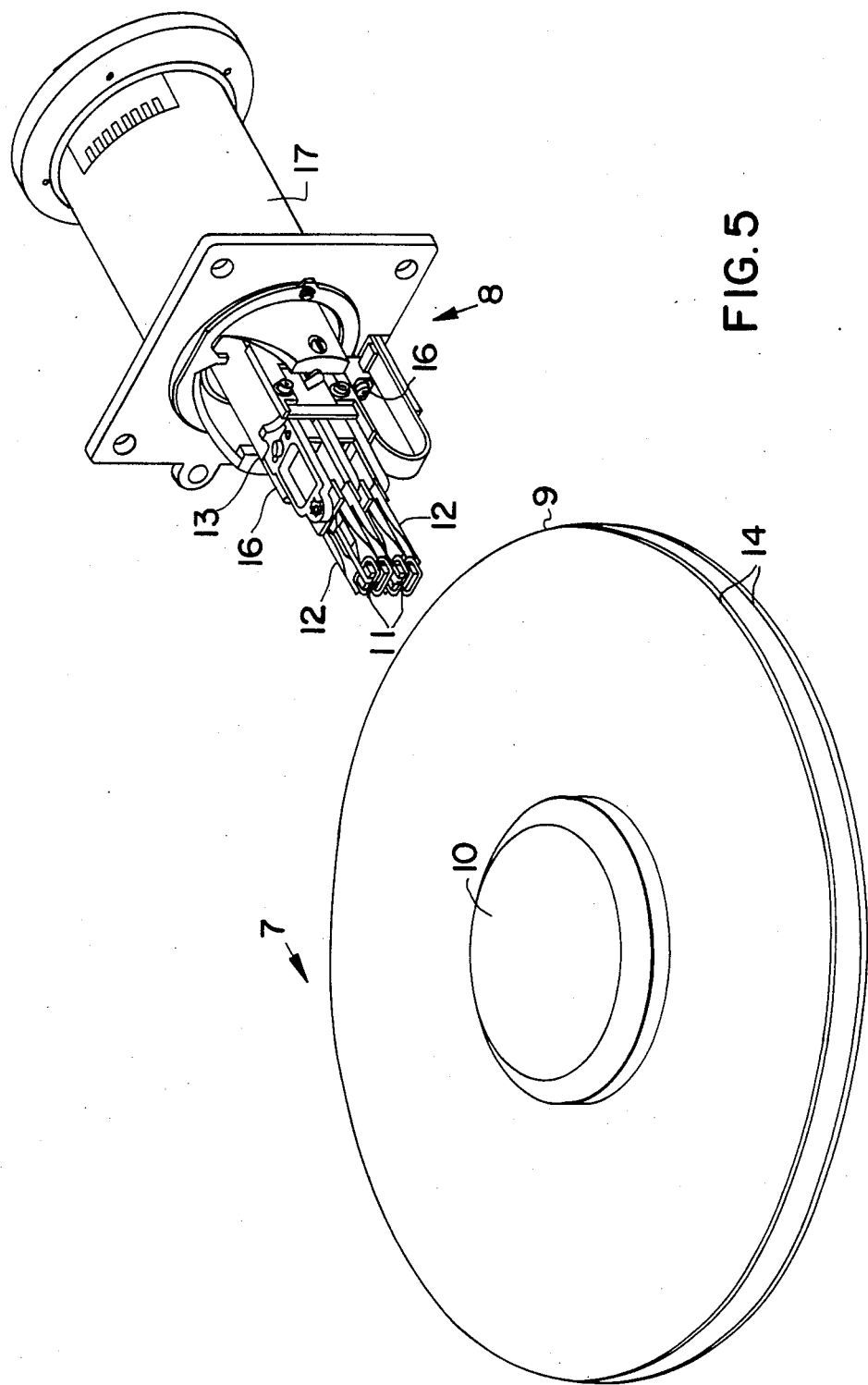
FIG. 5 is an exploded view of the disk-spindle and actuator-transducer carriage assemblies of a typical disk file.

FIG. 5 shows an exploded view of the disk-spindle assembly 7 and the actuator assembly 8 of a typical magnetic disk drive. The disks 9 are secured to a spindle 10 and rotate in unison at a constant speed during operation, such as 3600 RPM. The actuator assembly 8 presents transducer heads 11 that are gimbled on flexible mountings 12 and in turn secured to a single reciprocating carriage 13 which causes the transducers to move along a radius of the cooperating magnetic disk surface 14 to access data sectors disposed in concentric tracks. The carriage 13 has rollers (not shown) that engage ways 16 carried by the actuator assembly. A voice coil within the cylindrical structure 17 is disposed in a magnetic field established by permanent magnets and connected to the carriage 13 to drive the carriage radially inward or outward in accordance with the polarity of the current pulse supplied to the coil.

Figure 6:
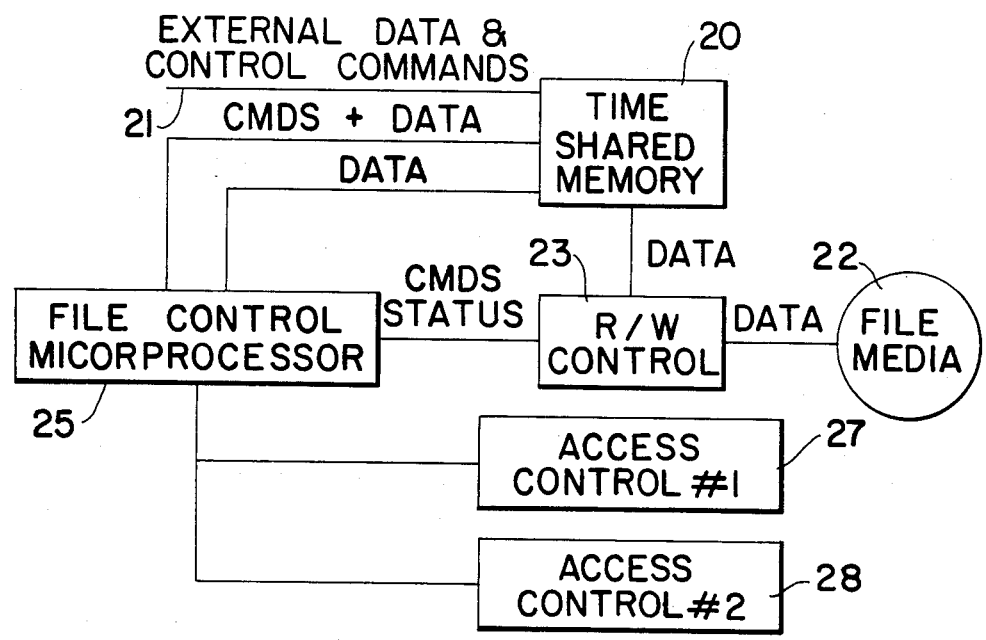
FIG. 6 is a block diagram showing hardware for implementing the invention.

FIG. 6 illustrates disk drive hardware for implementation of the present invention. External data and control commands are communicated from a time shared memory 20 on the bidirectional bus 21. From memory 20 data is transmitted to and received from the storage media 22 through the read/write control 23 which provides such functions as error correction code data checking and correction and assembly of the data to be written or manipulation of the data stream read from the media. File control microprocessor 25 provides the overall control of the disk file, issuing commands to both the read/write control 23 and the access mechanism circuits 27, 28 which control access and servo positioning of the one or more transducer supporting actuators.

While the invention has been particularly shown and described with reference to preferred embodiments thereof, it will be understood by those skilled in the art that various other changes in the form and details may be made therein without departing from the spirit and scope of the invention.

What is claimed is:

1. In a data storage device with multiple media surfaces that rotate in unison and a plurality of transducers carried by an actuator to enable movement in unison and alignment with concentric data tracks on said media surfaces permitting each transducer to be in a read/write relationship with one of a series of tracks, whereby at a given location the tracks confronting said plurality of transducers form a cylinder and wherein each of said data tracks are divided into a plurality of sequential sectors, each comprising an identifier portion and a data portion wherein said identifier portion includes a track ID, that identifies the cylinder and head; the actual sector number, the sequential number of the sector on the track; a displacement value, that specifies the number of sectors the logical sector has been displaced due to skipped defective sectors on previous tracks and/or spare sectors; and a defective sector list of sector numbers on the track which are to be skipped;

whereby the identifier portion of each sector provides the information as to the position of a plurality of the next subsequent logical sectors on the track.

2. The data storage device of claim 1 wherein said defective sector list contains an identification of all the sectors on the track that are to be skipped, whereby the identifier portion of each sector provides the information as to the position of every logical sector on the track.

3. The data storage device of claim 1 wherein the identifier portion and the data portion of each sector are recorded as a single consecutive sequence of data bits.

4. The data storage device of claim 3 wherein said sector data portion further includes an error correction field that corrects errors in the consecutive sequence of bits that form the combined identifier and data sector portions.

5. The data storage device of claim 4 wherein said sector identifier portion further includes flag bits for recording the data condition of the associated sector.

6. The method of storing data in a storage device having multiple media surfaces that rotate in unison and a plurality of transducers carried by an actuator for movement in unison into read/write alignment with respective data tracks on said media, wherein the data tracks accessed by said transducers when said actuator is at a given position form a cylinder, comprising reading an ID field, including the present sector identification and the identity of bad sectors to be skipped;

calculating the physical location of the sector addressed;

formulating the identifier information to be written into the addressed sector ID field;

counting sectors until the addressed sector is the next sector on the track; and synchronizing with the addressed sector sync field and writing the ID and data portions of the sector as a continuous, uninterrupted sequence of serial data.

7. The method of claim 6 wherein said data recording is continued in consecutive good sectors until the write command is completed.

8. The method of claim 7 wherein the writing of said sequence of serial data includes an error correction code that extends to both the data and ID sector portions.

* * * * *